(12) United States Patent
Kincaid

(10) Patent No.: US 10,379,607 B2
(45) Date of Patent: Aug. 13, 2019

(54) EXPERIMENTAL CHAMBER WITH COMPUTER-CONTROLLED DISPLAY WALL

(75) Inventor: Robert H. Kincaid, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1298 days.

(21) Appl. No.: 13/562,020

(22) Filed: Jul. 30, 2012

(65) Prior Publication Data

US 2014/0028711 A1 Jan. 30, 2014

(51) Int. Cl.
| | |
|---|---|
| *G09G 5/00* | (2006.01) |
| *G06F 3/01* | (2006.01) |
| *G06F 3/00* | (2006.01) |
| *G06F 3/042* | (2006.01) |
| *G09G 3/20* | (2006.01) |

(52) U.S. Cl.
CPC ............. *G06F 3/013* (2013.01); *G06F 3/005* (2013.01); *G06F 3/0425* (2013.01); *G09G 3/20* (2013.01); *G05B 2219/32014* (2013.01)

(58) Field of Classification Search
None
See application file for complete search history.

(56) References Cited

U.S. PATENT DOCUMENTS

| 7,324,081 B2 | 1/2008 | Friedrich | |
|---|---|---|---|
| 2003/0003430 A1* | 1/2003 | Ebersole | ............ A62C 99/0081 434/226 |
| 2004/0246274 A1* | 12/2004 | Rykowski et al. | ............ 345/690 |
| 2007/0021047 A1* | 1/2007 | Huang | .................. B08B 15/023 454/61 |
| 2008/0129704 A1* | 6/2008 | Pryor | ...................... G06F 3/011 345/173 |
| 2009/0041634 A1* | 2/2009 | Cracauer et al. | ............. 422/135 |
| 2009/0180846 A1* | 7/2009 | Nufer | .................... B08B 15/023 414/217 |
| 2011/0138285 A1* | 6/2011 | Kuo et al. | ...................... 715/727 |
| 2012/0074121 A1* | 3/2012 | Gagas et al. | .................. 219/385 |
| 2012/0105424 A1* | 5/2012 | Lee | ........................... G09F 9/35 345/212 |
| 2012/0188279 A1 | 7/2012 | Demaine | |

(Continued)

FOREIGN PATENT DOCUMENTS

| EP | 1586373 A1 | 10/2005 |
|---|---|---|
| WO | 2007/066166 A1 | 6/2007 |

OTHER PUBLICATIONS

Preliminary Report of Patentability, dated Feb. 12, 2015, PCT/US2013/052353.

*Primary Examiner* — Aaron M Richer
*Assistant Examiner* — Khoa Vu

(57) ABSTRACT

An environmental chamber having an interior compartment, an augmented display, and a controller is disclosed. The interior compartment is adapted for isolating an experimental setup from an environment external to the interior compartment. The augmented display is positioned to allow a user in the external environment to view the interior compartment and an image generated on the augmented display. The controller generates the image. The image includes information about a component within the interior compartment. The augment display can include a touch-enabled display screen that allows the user to interact with controller.

10 Claims, 3 Drawing Sheets

(56) References Cited

U.S. PATENT DOCUMENTS

| | | | |
|---|---|---|---|
| 2013/0049976 A1* | 2/2013 | Maggiore | 340/686.1 |
| 2013/0052927 A1* | 2/2013 | Broemsen | B08B 15/023 454/56 |
| 2013/0211583 A1* | 8/2013 | Borra | G07F 9/02 700/232 |
| 2014/0063054 A1* | 3/2014 | Osterhout et al. | 345/633 |

* cited by examiner

US 10,379,607 B2

EXPERIMENTAL CHAMBER WITH COMPUTER-CONTROLLED DISPLAY WALL

BACKGROUND

Experiments in chemistry and biology must often be performed in a chamber that isolates the experimental setup from the personnel performing the experiment. The isolation may be required to protect the personnel from products generated during the experiment such as toxic fumes or to protect the personnel from potential danger if the experimental apparatus fails. Isolation may also be required to protect the experiment from contamination by the personnel working on the experiment or substances in the environment. Biological experiments are easily ruined by microorganisms from the environment or the personnel working on the experiments. Similarly, semiconductor fabrication requires clean rooms and environments to prevent contamination from rendering the circuits being fabricated from damage during fabrication.

As experiments become more computerized, data collection and display components are often added to the experimental setup. These components are typically implemented on a separate computer system that allows the personnel to view data collected by sensors in the experiment or other experimental parameters. In addition, many experiments have a time span that extends beyond a single work shift, and hence, the experiment must be monitored during off hours and/or information about the experiment must be transferred between shifts of operating personnel. These communication functions are typically done manually by writing in a log or posting notes on the environmental chamber. The remote monitoring functions are likewise separate from the experimental setup and environmental chamber.

SUMMARY

The present invention includes an environmental chamber having an interior compartment, an augmented display, and a controller. The interior compartment is adapted for isolating an experimental setup from an environment external to the interior compartment. The augmented display is positioned to allow a user in the external environment to view the interior compartment and an image generated on the augmented display. The controller generates the image. The image includes information about a component within the interior compartment. The augmented display can include a touch-enabled display screen that allows the user to interact with the controller. In one aspect of the invention, the image includes information generated by sensors in the interior chamber. In another aspect of the invention, the image includes a drawing of the experimental setup with the information displayed on the drawing. In yet another aspect of the invention, the controller generates the drawing using information that specifies an experimental setup in the interior compartment. In a still further aspect of the invention, the controller transmits the augmented image to a remote location.

DETAILED DESCRIPTION OF EMBODIMENTS OF THE INVENTION

The present invention is based on the observation that the laboratory environment in which isolation chambers are required could benefit from augmented displays. For the purposes of this discussion, an augmented display is defined to be a transparent display screen on which additional information relative to the scene viewed through the display screen is displayed. In particular, an augmented display that replaces the transparent window in an environmental chamber and is controlled by a computer that is integrated into the experimental setup in the environmental chamber can be used to provide experiment isolation, display collected data, and facilitate remote monitoring of the environmental chamber.

Figure 1:
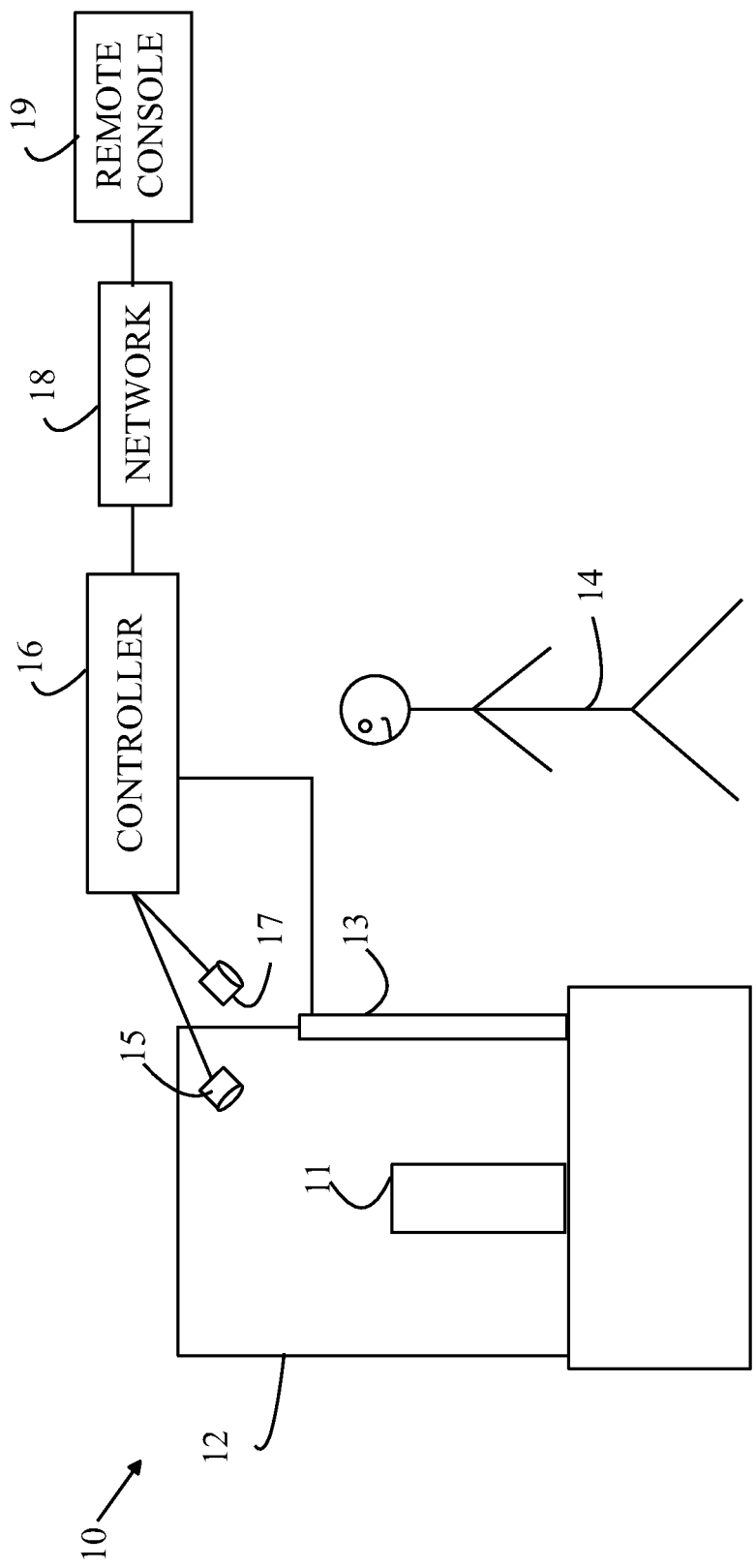
FIG. 1 illustrates a fume hood according to one embodiment of the present invention.

The manner in which the present invention provides its advantages can be more easily understood with reference to FIG. 1, which illustrates a fume hood 10 according to one embodiment of the present invention. For the purposes of this discussion, a fume hood is defined to be a chamber that includes a ventilation system that removes gases from the interior of the chamber to prevent those gases from reaching a user in the vicinity of the fume hood. The ventilation system maintains the chamber at a pressure that is less than that of the area in which the user is positioned. Typically, fume hoods include glass windows that can be lowered to separate the user from the interior of the chamber; however, the window is not required to provide an airtight seal. Fume hood 10 includes a transparent display screen 13 through which a user 14 views an experimental setup 11 that is enclosed in chamber 12. In this embodiment, the transparent display screen 13 replaces the conventional transparent window; however, embodiments in which transparent display screen 13 is provided between the conventional window and the user can also be constructed. In one aspect of the invention, transparent display screen 13 is constructed from a plastic material that will protect a user in the event of an explosion or discharge of materials within the chamber.

Fume hood 10 optionally includes a number of sensors whose outputs are processed by controller 16, which also controls the information displayed on transparent display screen 13. These sensors include sensors that monitor the experimental setup and sensors that monitor user 14. For example, a camera 15 having an extended spectral range views experimental setup 11 in the embodiment shown in FIG. 1. Additional sensors that are built into components in the experimental setup may also be present. A second camera 17 views user 14 and provides information about the user's position and the direction in which the user is looking. The use of this information will be explained in more detail below.

In one aspect of the invention, controller 16 also includes a connection to a network 18 that may include a link to the internet. This link allows controller 16 to communicate information collected during the experiment and various alerts to a remote location that can include a remote console 19 that reproduces the display on transparent display screen 13 for viewing by personnel at the remote site.

Figure 2:
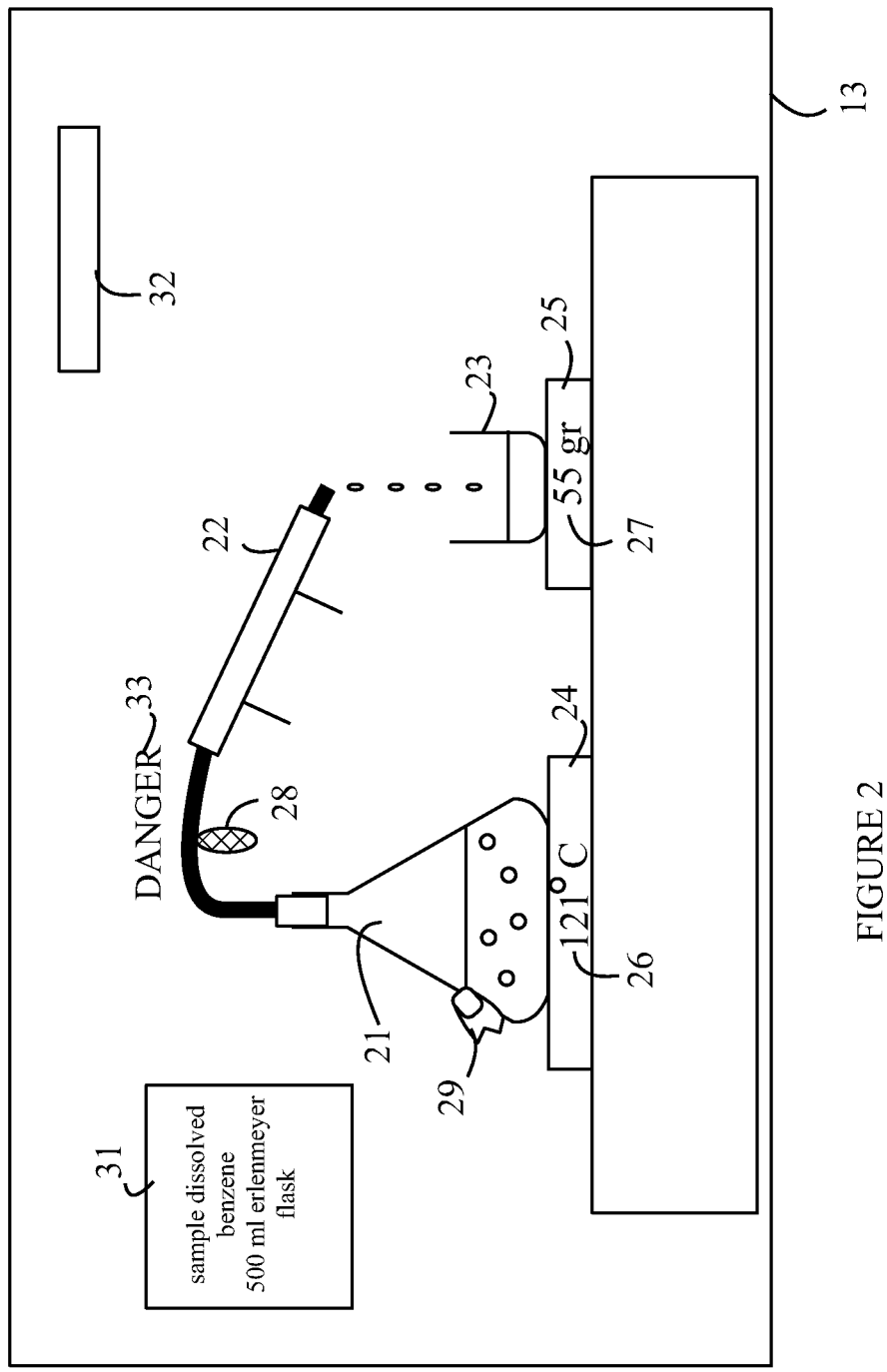
FIG. 2 illustrates the view of an exemplary experimental setup as seen by a user through the display screen.

Refer now to FIG. 2, which illustrates the view of an exemplary experimental setup as seen by user 14 through transparent display screen 13. The experimental setup consists of a distillation experiment in which a liquid in flask 21 is heated on a heater 24. The resultant vapors are condensed in a condenser 22 whose output is collected in beaker 23 that sits on a scale 25. For the purposes of this example, it is assumed that heater 24 includes a sensor that is connected to controller 16 and provides a readout of the temperature in the flask. Similarly, it will be assumed that scale 25 has a readout that is transmitted to controller 16. Finally, it will be assumed that camera 15 provides an infrared image to controller 16, which controller 16 uses to identify localized hot spots inside the fume hood 10.

The additional information that controller 16 provides on transparent display screen 13 is shown at 26-28. The information at 26 is the temperature provided by the heater sensor. The information at 27 is the weight recorded on the scale. At 28, a heated region that was viewed with the infrared camera is displayed to warn the user of a hot spot that probably results from a leak in the tubing connecting flask 21 to condenser 22.

Controller 16 can also provide additional information on transparent display screen 13 in response to user input. In one aspect of the invention, transparent display screen 13 is a touch-enabled screen and controller 16 is programmed to detect various gestures that are executed on transparent display screen 13 by a user when the user touches transparent display screen 13. For the purposes of this discussion, a gesture will be defined to be an action in which the user touches the screen and moves the user's finger while the finger remains in contact with the screen. Gestures may involve more than one finger. The user can elicit additional information about the experiment or a component of the experimental setup by touching transparent display screen 13 or executing a predetermined gesture on transparent display screen 13 at a predetermined location. The information displayed will, in general, depend on the experimental setup, the location at which the touch or gesture is performed, and the nature of the gesture.

For example, if the user touches transparent display screen 13 at a location corresponding to flask 21 as shown at 29, controller 16 displays information about the contents of the flask and, optionally, the flask itself in a pop-up window 31. If the particular component of the experimental setup has additional sensors associated with that component, and those sensors are not currently displayed, pop-up window 31 can display them in response to a gesture indicating additional information about the component that was identified by the first gesture. For example, a two-finger gesture executed over pop-up window 31 or flask 21 in which the fingers are moved apart relative to one another could be utilized to request more detailed information on flask 21 or its contents.

Additional information that pertains to other aspects of the experimental setup or protocol can be elicited by touching a menu 32 provided on transparent display screen 13. This information could also include a log used by various laboratory personnel to make notes on the experiment and to communicate with one another.

Controller 16 also displays various warnings such as the "DANGER" message shown at 33 in response to one or more of the sensors that monitor the experiment detecting a problem. In one aspect of the invention, controller 16 accesses sensors that measure conditions within chamber 12 and compares those measurements to expected levels to determine if problems exist. For example, camera 15 could be an infrared camera that measures temperatures as a function of location within chamber 12. If a measured temperature value exceeds a predetermined threshold, a safety alert is displayed together with information identifying the region in which elevated temperature was detected.

In one aspect of the invention, controller 16 communicates over network 18 to a monitoring site that a problem has been encountered and displays information on a display at that monitoring site that gives a person at the site the ability to respond to that information using a display screen that reproduces the scene that would be seen by a user in front of transparent display screen 13. In one aspect of the invention, the remote console includes a touch-enabled display screen that allows the user to interact with the experiment in the same manner that a person standing at transparent display screen 13 could interact.

In another aspect of the invention, controller 16 records the data from the various sensors at intervals specified in an experimental setup program that is part of the experiment being executed. This data may also include pictures taken with cameras, such as camera 15 shown in FIG. 1, to further document the experiment.

In the above described embodiments, the user touches the screen at a location that corresponds to one of the components in the experimental setup to elicit information about that component. However, the component in question is located some distance behind the display screen. In one aspect of the invention, controller 16 determines which component is being selected by using camera 17 shown in FIG. 1 to determine the position of the user's eye relative to transparent display screen 13. Given this information and the point on transparent display screen 13 at which the user touches transparent display screen 13, controller 16 can correct for parallax and determine which component the user is indicating when the user touches transparent display screen 13.

In the above-described embodiments, the information displayed on transparent display screen 13 augments the view of the experimental setup that the user sees looking through transparent display screen 13. In another aspect of the invention, a separate image of the experimental setup is generated on the display screen itself by controller 16. For example, this image can be generated by using the images captured by a camera such as camera 15 when the user selects an option by a gesture on transparent display screen 13.

In another aspect of the invention, the image is generated from the experimental setup information stored in controller 16. In this case, the image could be a stylized image that represents the experimental setup. An image generated on the display screen itself has the advantage of being free from the parallax problems discussed above. In addition, the stylized image is more easily reproduced on remote terminals that have lower resolution displays.

Figure 3:
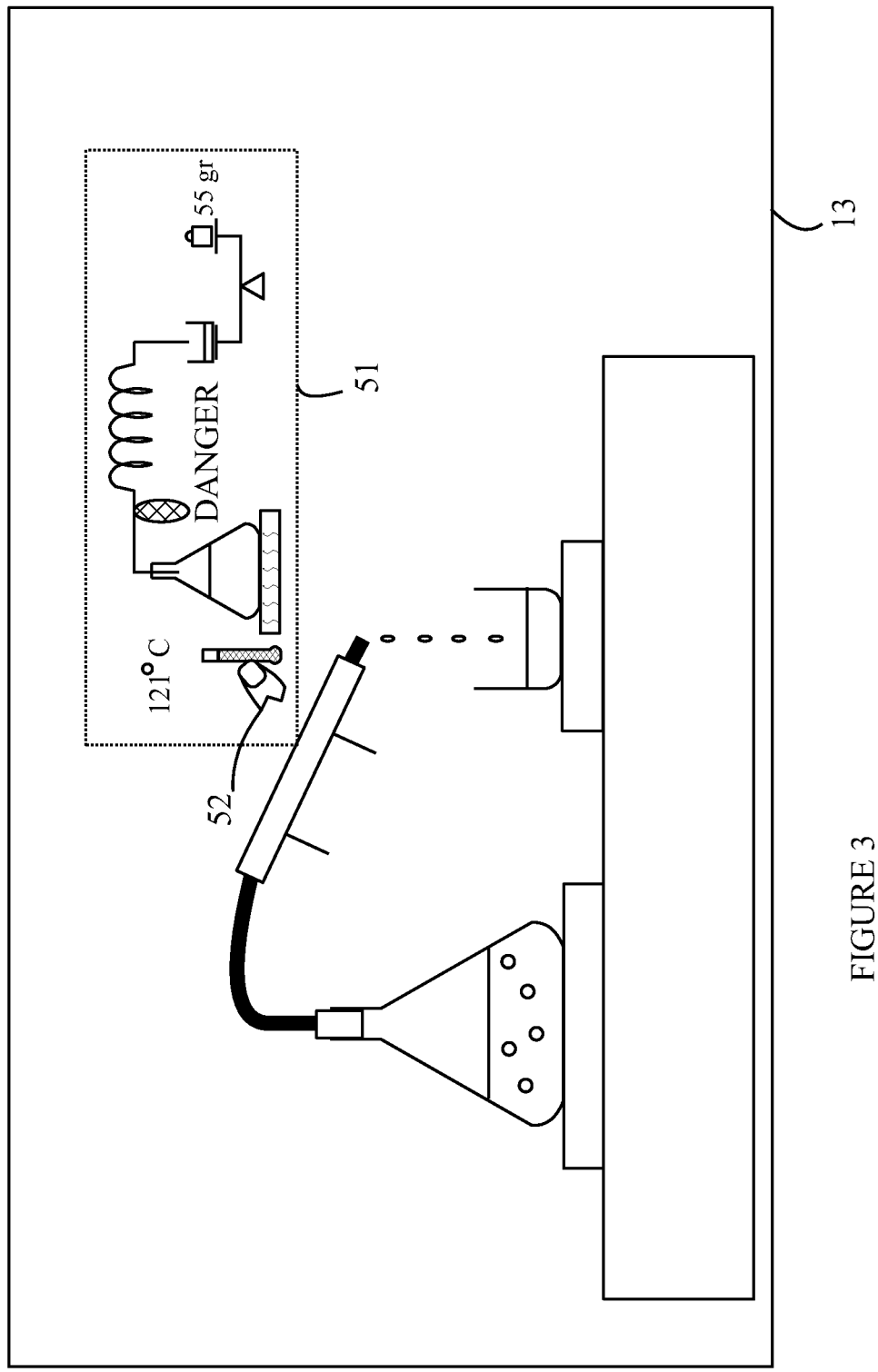
FIG. 3 illustrates the view through the display screen in an embodiment of the present invention that employs such a stylized image.

Refer now to FIG. 3, which illustrates the view through transparent display screen 13 in an embodiment of the present invention that employs such a stylized image. The experimental setup shown in FIG. 3 is the same as that shown in FIG. 2. However, in FIG. 3, a stylized representation of the experimental setup in which the various components are replaced by graphical symbols is generated at 51 by controller 16. The sensor data is presented in the stylized representation rather than at locations near the actual components in the experiment. In this embodiment, the user can execute gestures on stylized representation 51 to elicit additional information in a manner analogous to that discussed above. For example, the user can elicit the temperature reading from the heater by touching the graphical symbol for the thermometer in stylized representation 51 as shown at 52.

In one aspect of the invention, the stylized representation of the experimental setup is transmitted to a remote console so that personnel who are not at the experiment site can monitor and control the experiment. In such an arrangement, the actual image of the experimental setup does not need to be sent continually, as the data is on the stylized representation, and that representation can be sent over channels with very limited bandwidth.

The above-described embodiments of the present invention utilize a relatively large semi-transparent display screen located between the experiment in the fume hood and the laboratory personnel who are interacting with the experiment. The screen must be capable of displaying information that can be viewed by the user. It would be advantageous for this screen to also be a touch-enabled screen or capable of determining a position on the screen in response to a user interaction with the screen. A screen constructed from a material that can protect the user from an explosion or discharge of toxic materials within the chamber is also advantageous. In one aspect of the invention, transparent display screen 13 is constructed from a translucent plastic that allows the user to see through the screen and also allows an image to be projected on the screen such that the user simultaneously views both the generated image and the scene behind transparent display screen 13.

Technologies for tracking the position of a user's finger or a stylus on a large screen are known to the art, and hence, will not be discussed in detail here. For the purposes of this discussion, it should be noted that the position at which the user touches the screen with the user's finger or a special stylus can be determined optically, electrically, or acoustically. For example, an optical system that uses a camera that views the user through the screen can detect the point at which the user touches the screen. Referring again to FIG. 1, such a camera is shown at 36. Systems that cause the point of contact of the user's finger on the screen to emit light of a predetermined color are also known to the art. For example, U.S. Pat. No. 7,310,090 describes a system in which light is trapped within a thin film by internal reflection. When the user touches the film, part of the light is caused to escape at the point of contact and viewed by a camera on the other side of the thin film. In principle, a camera on the user's side of the display screen could also be used to determine the location at which the user is touching the screen.

Systems for tracking a stylus relative to the screen are used in presentation systems for classrooms or conferences. In one type of system, the stylus emits an ultrasound pulse that is detected by sensors on the edge of the display area. The time delay between the emission of the pulse and its reception at a plurality of locations is used to determine the position of the stylus.

Position sensing using electrical properties of a transparent layer attached to the screen can also be utilized. Such systems measure an electrical property of the layer from contacts at a plurality of points on the periphery of the screen. When the user presses the user's finger on the screen, the position of the interaction with the screen is determined by measuring a corresponding property at the contact points.

Information can be displayed on the screen by projecting an image onto the screen. In this case, the screen needs to be translucent so that the user can see through the screen in addition to seeing the information projected on the screen. A projector such as projector 37 shown in FIG. 1 can be utilized for this purpose. Using a rear projection scheme has the advantage of avoiding shadowing of the image by the user.

As noted above, in some aspects of the invention, controller 16 includes information about the experimental setup. This information can be entered as part of the experimental setup information and/or collected by controller 16 itself. For the purpose of this discussion, the data entry process can be divided into two phases. The first involves inputting data specifying the components of the experimental setup and how these components are connected. The second phase involves making a correspondence between the elements from the first phase and the images seen by the controller through the cameras.

If the user enters the setup information manually, a graphical user interface system in which the user picks components from predetermined lists of components and selects how the components are connected to one another could be utilized. Commercial software that provides these functions are known to the art, and hence, will not be discussed in detail here. In one aspect of the invention, some of the components are selected from a predetermined list of components in which the information for each component in the list includes information as to any sensors associated with that component and how those sensors are accessed and the results displayed.

For example, the entry for heater 24 shown in FIG. 2 could indicate that the heater has a temperature sensor that can be accessed by the local area network using an IP address specified in the entry and a specific URL command that retrieves the temperature reading in a predetermined format. The entry may also include information specifying a graphical representation for the component in question. In one aspect of the invention, the graphical representation is used to construct the portion of the stylist experimental display discussed above with reference to FIG. 3.

In another aspect of the invention, controller 16 determines one or more of the components in the experimental setup using sensors that are part of controller 16 that use the image of the component or a identification tag associated with the component. For example, a camera such as camera 15 can be used to generate an image of the experimental setup that is then processed through image recognition software on controller 16 to determine the specific components in the experimental setup. Controller 16 then looks up the attributes of the components in a table of predetermined components. Controller 16 could also determine the connections between the components from such images. This process can be facilitated by machine readable labels on one or more components such as bar codes or radio frequency identification tags.

The above-described embodiments of the present invention have been discussed in relationship to a fume hood. However, the principles of the present invention can also be applied to improve other forms of environmental chambers that have transparent walls, or walls including transparent windows, that separate an area in which personnel work from an area containing the environment being monitored. While such chambers may have controlled environments, chambers in which the transparent wall acts as a safety shield for protecting the area outside the chamber in the event of an explosion or other safety situation can also benefit from the present invention.

It should also be noted that an existing environmental chamber can be converted to an environmental chamber according to the present invention by providing a transparent display between an existing glass wall of the chamber and the user and providing suitable sensors to monitor the interior of the chamber.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A chamber comprising:
an interior compartment that is separated from an external environment adapted for personnel who monitor said interior compartment;
a transparent augmented display positioned between said interior compartment and said external environment that allows a user in said external environment to view said interior compartment through said transparent augmented display and an image generated on said augmented display; and
a controller that generates said image, wherein said image comprises information about a component within said interior compartment, wherein said interior compartment comprises a fume hood, wherein said image comprises information generated by a plurality of sensors in said interior compartment.

2. A chamber comprising:
an interior compartment that is separated from an external environment adapted for personnel who monitor said interior compartment;
a transparent augmented display positioned between said interior compartment and said external environment that allows a user in said external environment to view said interior compartment through said transparent augmented display and an image generated on said augmented display; and
a controller that generates said image, wherein said image comprises information about a component within said interior compartment,
wherein said image comprises a drawing of an experimental setup within said interior compartment with said information displayed on said drawing,
wherein said experimental setup comprises a plurality of components and wherein said controller utilizes a sensor that communicates with said controller to identify one of said components, and
wherein said sensor comprises a camera and said controller utilizes an image from said camera to identify said component.

3. A chamber comprising:
an interior compartment that is separated from an external environment adapted for personnel who monitor said interior compartment;
a transparent augmented display positioned between said interior compartment and said external environment that allows a user in said external environment to view said interior compartment through said transparent augmented display and an image generated on said augmented display; and
a controller that generates said image, wherein said image comprises information about a component within said interior compartment,
wherein said image comprises a drawing of an experimental setup within said interior compartment with said information displayed on said drawing and
wherein said controller transmits said image to a remote location at which said transparent augmented display cannot be viewed.

4. A chamber comprising:
an interior compartment that is separated from an external environment adapted for personnel who monitor said interior compartment;
a transparent augmented display positioned between said interior compartment and said external environment that allows a user in said external environment to view said interior compartment through said transparent augmented display and an image generated on said augmented display; and
a controller that generates said image, wherein said image comprises information about a component within said interior compartment,
wherein said controller transmits an image that would be seen through said augmented display to a remote location at which said transparent augmented display cannot be viewed.

5. A chamber comprising:
an interior compartment that is separated from an external environment adapted for personnel who monitor said interior compartment;
a transparent augmented display positioned between said interior compartment and said external environment that allows a user in said external environment to view said interior compartment through said transparent augmented display and an image generated on said augmented display; and
a controller that generates said image, wherein said image comprises information about a component within said interior compartment, wherein said interior compartment comprises a fume hood,
wherein said augmented display is a touch-enabled display screen that responds to a user touching said augmented display in an area through which said user views said interior compartment, and
wherein said controller determines a direction in which a user is looking into said interior compartment and uses said determined direction to identify a component in said interior compartment identified by said user when said user touches said touch-enabled display screen.

6. A chamber comprising:
an interior compartment that is separated from an external environment adapted for personnel who monitor said interior compartment;
a transparent augmented display positioned between said interior compartment and said external environment that allows a user in said external environment to view said interior compartment through said transparent augmented display and an image generated on said augmented display; and
a controller that generates said image, wherein said image comprises information about a component within said interior compartment, of said chamber, wherein said image comprises a drawing of an experimental setup within said interior compartment with said information displayed on said drawing and
further comprising a camera that forms an infrared image of said interior compartment.

7. The chamber of claim 6 wherein said controller includes information from said infrared image in said generated image.

8. The chamber of claim 7 wherein said generated image indicates regions of elevated temperature in said chamber.

9. The chamber of claim 8 wherein said controller generates a safety alert if one of said elevated temperature regions exceeds a predetermined threshold.

10. A chamber comprising:
an interior compartment that is separated from an external environment adapted for personnel who monitor said interior compartment;
a transparent augmented display positioned between said interior compartment and said external environment that allows a user in said external environment to view said interior compartment through said transparent augmented display and an image generated on said augmented display; and
a controller that generates said image, wherein said image comprises information about a component within said interior compartment, wherein said interior compartment comprises a fume hood,
wherein said image comprises information from sensors associated with components in said interior compartment.

* * * * *